United States Patent [19]

Johansson et al.

[11] Patent Number: 5,526,387
[45] Date of Patent: Jun. 11, 1996

[54] FLOW TABS FOR A FUEL ROD BUNDLE SPACER

[75] Inventors: Eric B. Johansson, Wrightsville Beach, N.C.; Bruce Matzner, San Jose, Calif.

[73] Assignee: General Electric Company, Schenectady, N.Y.

[21] Appl. No.: 289,609

[22] Filed: Aug. 12, 1994

[51] Int. Cl.⁶ ..................................... G21C 3/34
[52] U.S. Cl. ........................ 376/439; 376/438; 376/443; 376/448; 376/454
[58] Field of Search .................... 376/439, 443, 376/448, 454, 438; 976/DIG. 71, DIG. 78, DIG. 74

[56] References Cited

U.S. PATENT DOCUMENTS

| | | | |
|---|---|---|---|
| 4,039,379 | 8/1977 | Patterson et al. | 376/439 |
| 4,058,945 | 11/1977 | Knapp | 52/244 |
| 4,112,648 | 9/1978 | Suzuki et al. | 52/508 |
| 4,124,447 | 11/1978 | Gross | 376/287 |
| 4,192,717 | 3/1980 | Gross | 376/463 |
| 4,508,679 | 4/1985 | Matzner et al. | 376/438 |
| 4,544,522 | 10/1985 | Crulla et al. | 376/441 |
| 4,585,615 | 4/1986 | DeMario | 376/442 |
| 4,585,616 | 4/1986 | DeMario et al. | 376/442 |
| 4,683,115 | 7/1987 | Frömel | 376/439 |
| 4,692,302 | 9/1987 | DeMario et al. | 376/439 |
| 4,698,204 | 10/1987 | Taleyarkhan | 376/439 |
| 4,702,881 | 10/1987 | Weiland et al. | 376/442 |
| 4,726,926 | 2/1988 | Patterson et al. | 376/439 |
| 4,762,669 | 8/1988 | Doshi | 376/442 |
| 4,879,090 | 11/1989 | Perrotti et al. | 376/462 |
| 4,999,153 | 3/1991 | Johansson et al. | 376/443 |
| 5,080,858 | 1/1992 | Nylund | 376/443 |
| 5,089,221 | 2/1992 | Johansson et al. | 376/442 |
| 5,180,548 | 1/1993 | Verdier | 376/439 |
| 5,186,891 | 2/1993 | Johansson et al. | 376/438 |
| 5,209,899 | 5/1993 | Johansson et al. | 376/442 |
| 5,327,470 | 7/1994 | Johansson | 376/438 |

FOREIGN PATENT DOCUMENTS

| | | |
|---|---|---|
| 0237064 | 9/1987 | European Pat. Off. . |
| 2072154 | 9/1971 | France . |
| 3519421A1 | 12/1986 | Germany . |
| 9303692 U | 3/1993 | Germany . |

*Primary Examiner*—Donald P. Walsh
*Assistant Examiner*—Meena Chelliah
*Attorney, Agent, or Firm*—Nixon & Vanderhye

[57] ABSTRACT

A spacer for use with a fuel bundle in a nuclear reactor includes a matrix of ferrules for surrounding individual fuel rods within a bundle; a band surrounding the matrix and defining a peripheral wall of the spacer, the band having an upper edge; and a plurality of laterally spaced flow tabs extending upwardly from the upper edge, each flow tab having a lower substantially vertical portion and an upper inclined portion extending away from the vertical portion. The vertical portion and the inclined portion are formed with centrally located creases which define reverse bends in the upper and lower portions of the tab.

17 Claims, 4 Drawing Sheets

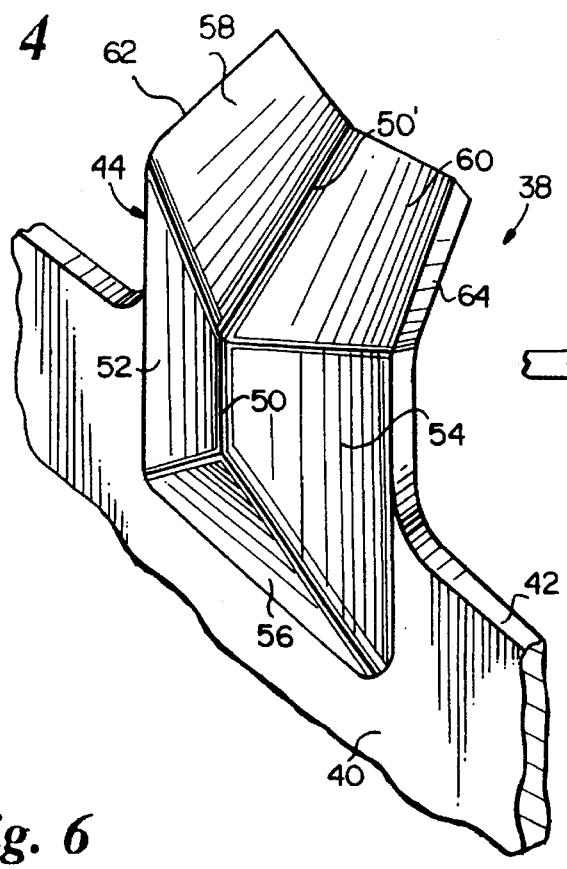
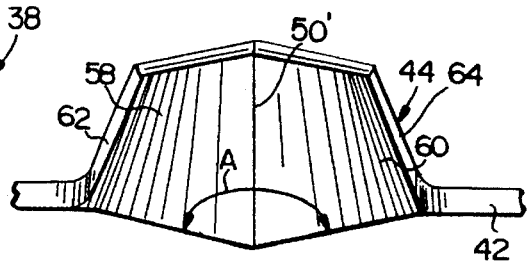
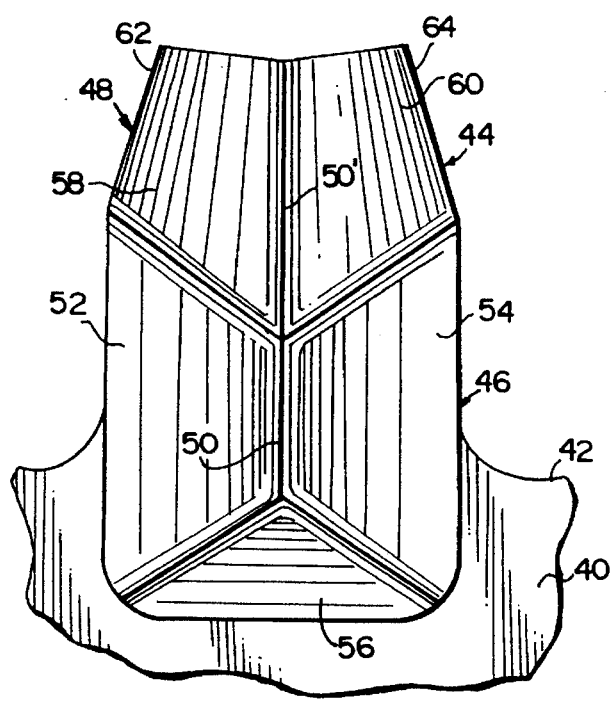
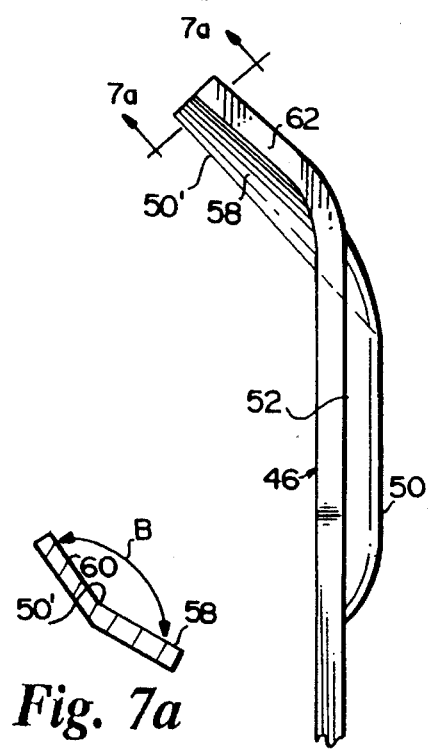

5,526,387

FLOW TABS FOR A FUEL ROD BUNDLE SPACER

TECHNICAL FIELD

This invention relates to spacers used in a boiling water nuclear reactor (BWR) fuel bundle for maintaining the fuel rods within the fuel bundle in their designed spaced apart relationship. More specifically, the spacer construction in accordance with this invention incorporates improved flow tabs on the peripheral band of the spacer to direct more of the liquid coolant flow toward the outer fuel rods in the bundle rather than merely into the spaces between the fuel rods.

BACKGROUND

Fuel bundles in boiling water nuclear reactors (BWR's) include an array of upstanding side-by-side fuel rods supported between upper and lower tie plates. Each bundle requires multiple spacers (e.g., seven, axially spaced along the bundle) for the maintenance of the fuel rods in designed spaced apart relationship. The bundle is surrounded between the tie plates by a fuel bundle channel. The lower tie plate is configured to permit the inflow of moderating water coolant while the upper tie plate permits the outflow of both water coolant and generated steam. The surrounding channel confines the flow of coolant to a path around the steam generating fuel rods separate from a water flooded core bypass region surrounding each fuel bundle.

Flow tabs are used on the peripheral bands of each spacer to deflect liquid coolant flow from the band to the outer row of fuel rods. This flow redirection deposits water droplets on the fuel rods, increasing the water film thickness and improving the critical power performance of the outer fuel rods. Currently utilized flow tabs consist of simple, planar projections which extend upwardly from the band and which are bent inward at their outer ends.

With reference to FIGS. 1 to 3, a conventional fuel assembly 10 comprises a plurality of fuel elements or rods 12 supported between an upper tie plate 14 and a lower tie plate 16. The fuel rods 12 pass through a plurality of fuel rod spacers 18 which provide intermediate support and retain the elongated rods in spaced relation. Each spacer contains a matrix of ferrules F, each adapted to receive and surround a corresponding fuel rod 12. In a typical arrangement, seven such spacers 18 may be located along the approximate 13 foot length of the fuel bundle.

Each of the fuel rods 12 includes an elongated tube containing fissile fuel and other materials, such as fertile fuel, burnable poison, inert material or the like, sealed in the tube by upper and lower end plugs 20, 22, respectively. Lower end plugs 22 are formed with extensions for registration and support within openings formed in the lower tie plate 16. At the same time, the upper end plugs 20 are formed with extensions which fit into support openings in the upper tie plate 14.

The fuel assembly 10 also includes a thin walled tubular flow channel 24 of substantially square cross section, sized to form a sliding fit over the upper and lower tie plates 14 and 16 as well as spacers 18 so that the channel may be easily mounted to or removed from the fuel bundle.

The lower tie plate 16 is formed with a nosepiece 26 adapted to support the fuel assembly 10 in a socket in a core support plate (not shown) in the reactor pressure vessel. The end of this nosepiece is formed with an opening 28 which receives pressurized coolant in an upward flow direction.

FIGS. 2 and 3 of the drawings show top and side views, respectively, of the corner region of a conventional spacer 18. Flow tabs 20 are shown extending upwardly from an upper edge 30 of the peripheral band 32 of the spacer, and between adjacent fuel rods 12. Each tab comprises a lower, substantially vertical portion 34 and an upper inwardly bent portion 36. Side edges of each tab are generally inwardly tapered in the upward direction, and both portions 34 and 36 are substantially planar. The bent upper portions 36 of the flow tabs 20 project into the region between each pair of fuel rods 12. The two phase (water and steam) coolant flow is upward, and the steam water mixture flows around the flow tabs while some of the flow is deflected in the direction normal to the flow tab, toward the interior of the spacer. This results in some water being deposited on the adjacent fuel rods 12 and increasing the thickness of the water film.

Other representative examples of flow tabs incorporated into fuel bundle spacers may be found in U.S. Pat. Nos. 5,180,548; 5,080,858; 4,879,090; 4,692,302; 4,698,204; 4,683,115 and 4,039,379.

SUMMARY OF THE INVENTION

The present invention relates to an improved flow tab design which redirects more of the liquid component of the steam water mixture toward the outer fuel rods rather than into the space between the fuel rods, and which offers less resistance generally to the flow of coolant through the channel.

In an exemplary embodiment, both the lower and upper portions of the flow tab are provided with secondary bends about vertical and inclined center lines. More specifically, the upper inwardly bent portion has a secondary bend along its inclined center line such that this center line is located downward relative to the outer or side edges of the tab. This shape imparts velocity components to the flow which are parallel to the spacer band and away from the flow tab. As a result, more water droplets are channeled directly to the surfaces of the outer fuel rods.

The lower, substantially vertical portion of the flow tab is also formed with a secondary bend about its vertical center line such that the latter is located outwardly of the side edges of the tab, and outwardly of the spacer band itself. This improved lower tab configuration increases the stiffness of the flow tab, and makes it easier to form. In addition, the overall size of the tab relative to conventional tabs as shown in FIGS. 1–3, has been increased to deflect greater amounts of coolant flow.

In its broader aspects, the invention relates to a spacer for use with a fuel bundle in a nuclear reactor, the spacer comprising a matrix of ferrules for surrounding individual fuel rods within a bundle; a band surrounding the matrix and defining a peripheral wall of the spacer, the band having an upper edge; a plurality of laterally spaced flow tabs extending upwardly from the upper edge, each flow tab having a substantially vertical portion and an inclined portion; and first means on the inclined portion for imparting velocity components to a flow of coolant along the fuel rods, which components are substantially parallel to the band.

In another aspect, the invention relates to a spacer for use with a fuel bundle in a nuclear reactor, the spacer comprising a matrix of ferrules for surrounding individual fuel rods within a bundle; a band surrounding the matrix and defining a peripheral wall of the spacer, the band having an upper edge; and a plurality of laterally spaced flow tabs extending upwardly from the upper edge, each flow tab having a substantially vertical portion joined to the band and an inclined portion joined to the vertical portion and extending upwardly and inwardly relative to the vertical portion, the inclined portion having a first center line located downwardly and inwardly relative to a pair of lateral free edges of the inclined portion.

In still another aspect, the invention relates to a spacer for use with a fuel bundle in a nuclear reactor comprising a matrix of ferrules for surrounding individual fuel rods within a bundle; a band surrounding the matrix and defining a peripheral wall of the spacer, the band having an upper edge; and a plurality of laterally spaced flow tabs extending upwardly from the upper edge, each flow tab having a lower substantially vertical portion and an upper inclined portion extending away from the vertical portion, the vertical portion having a vertical crease and the inclined portion having an inclined crease, each located centrally of the tab.

It will be appreciated that the improved flow tab configuration in accordance with this invention directs more of the liquid flow directly onto the outer fuel rods and offers less resistance to coolant flow, thereby enhancing overall fuel bundle performance.

Other objects and advantages of the invention will become apparent from the detailed description which follows.

BRIEF DESCRIPTION OF THE DRAWINGS

FIG. 4 is a partial perspective of a spacer incorporating modified flow tab in accordance with the present invention;

FIG. 5 is a side elevation of the flow tab shown in FIG. 4, viewed in the direction of arrow A;

FIG. 6 is a top plan view of the flow tab illustrated in FIG. 4;

FIG. 7 is a side elevation of the flow tab illustrated in FIG. 4;

FIG. 7a is a section taken along the line 7a—7a in FIG. 7;

BEST MODE FOR CARRYING OUT THE INVENTION

Figure 1:
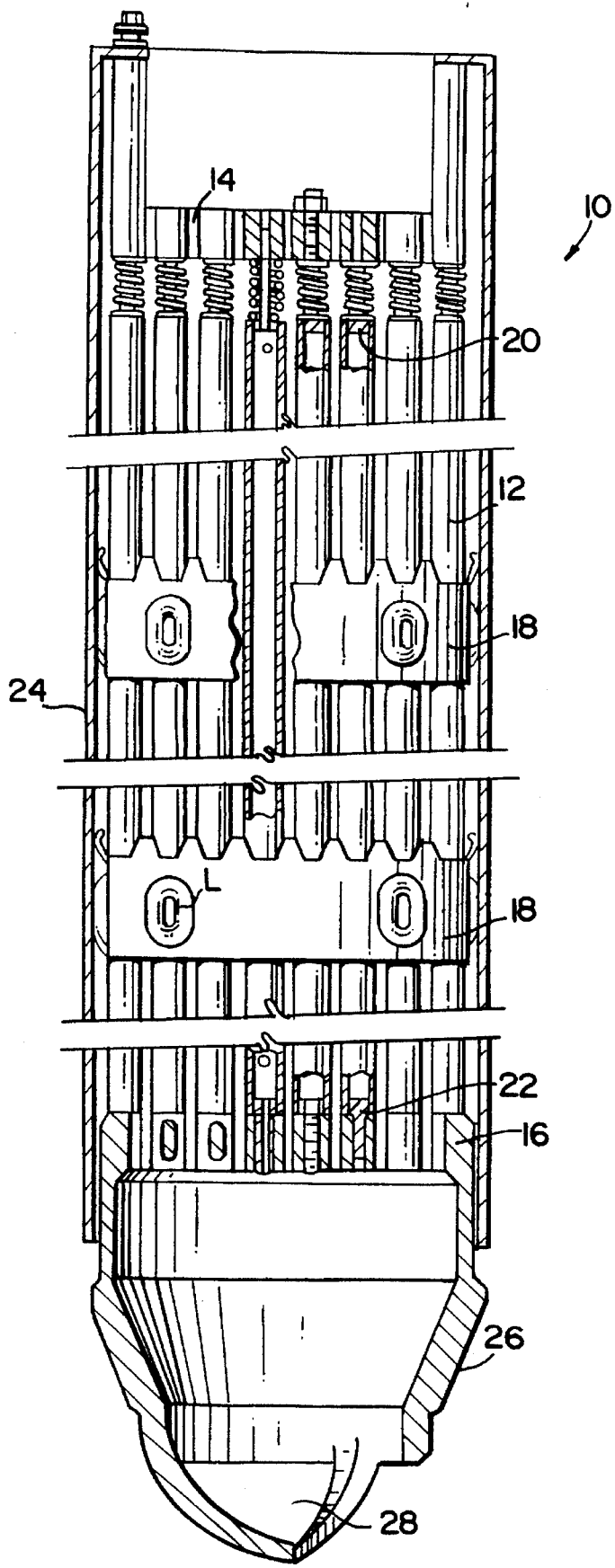
FIG. 1 side elevation, partly in section, of a conventional BWR fuel bundle.
Figure 2:
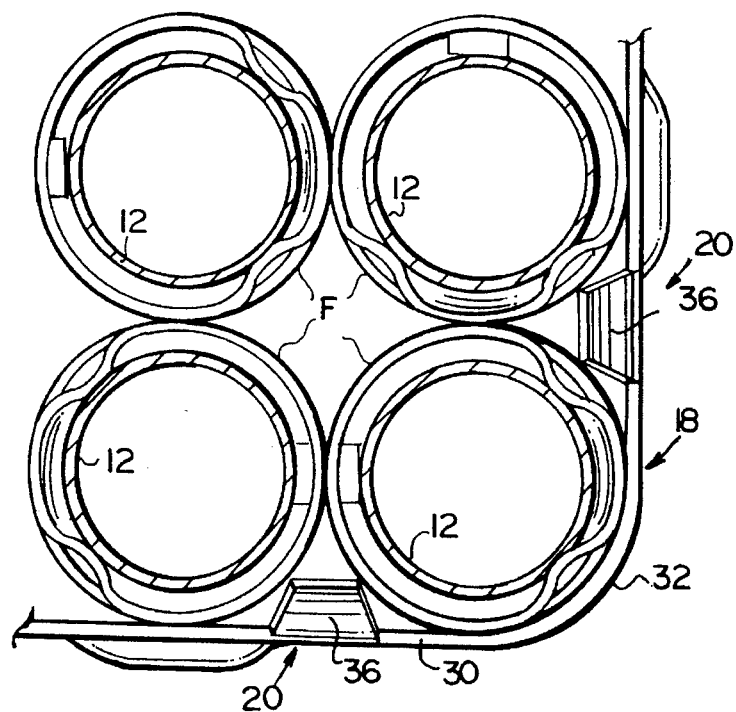
FIG. 2 is a partial plan view of a corner region of a conventional spacer as shown in FIG. 1, illustrating conventional flow tabs at the upper edge of the spacer.
Figure 3:
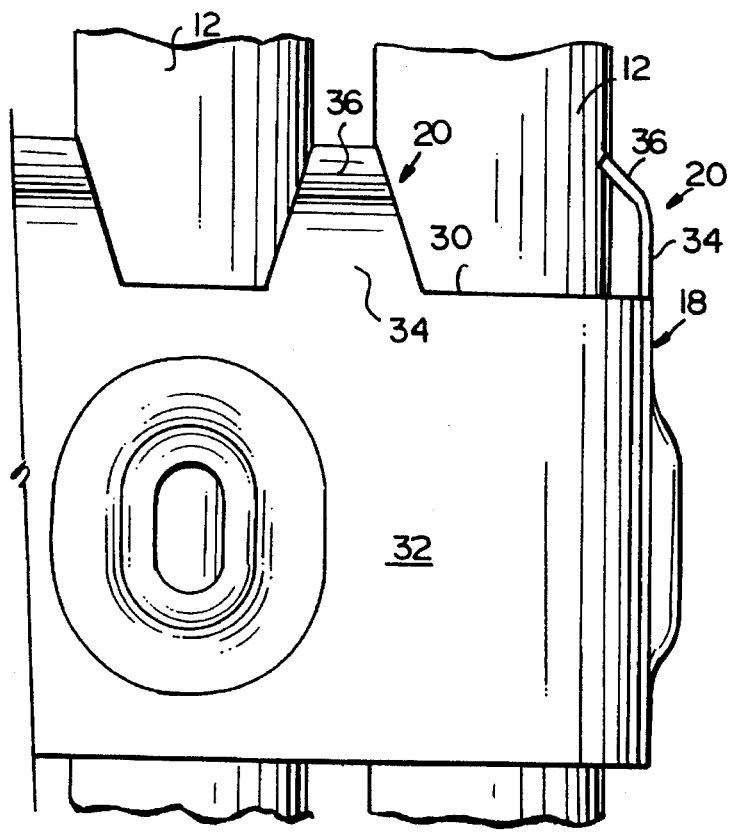
FIG. 3 is a front elevation of FIG. 2.
Figure 8:
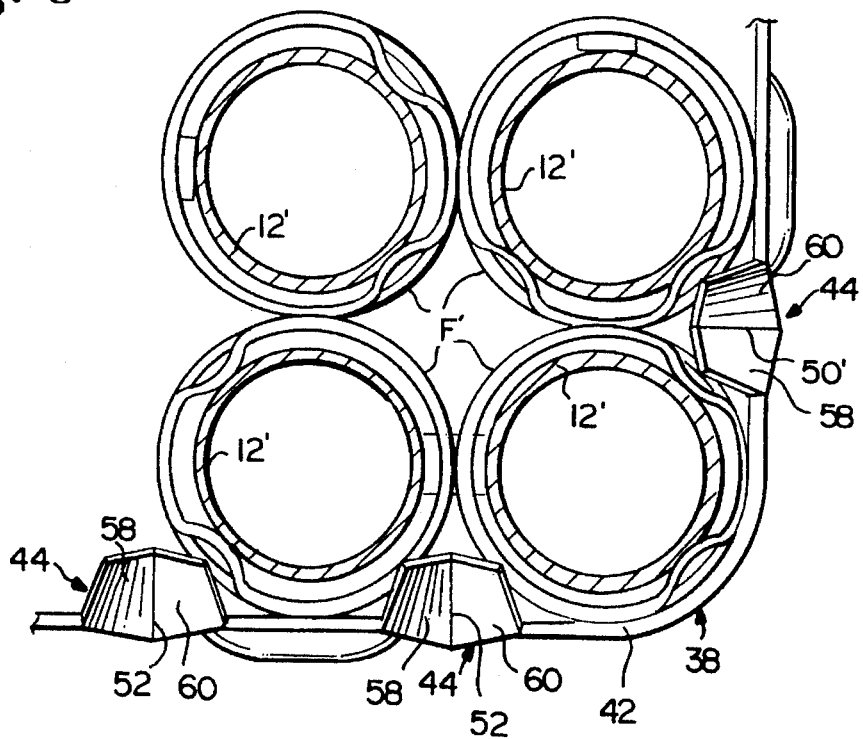
FIG. 8 is a partial plan view of a corner region of a spacer incorporating the flow tab in accordance with this invention.
Figure 9:
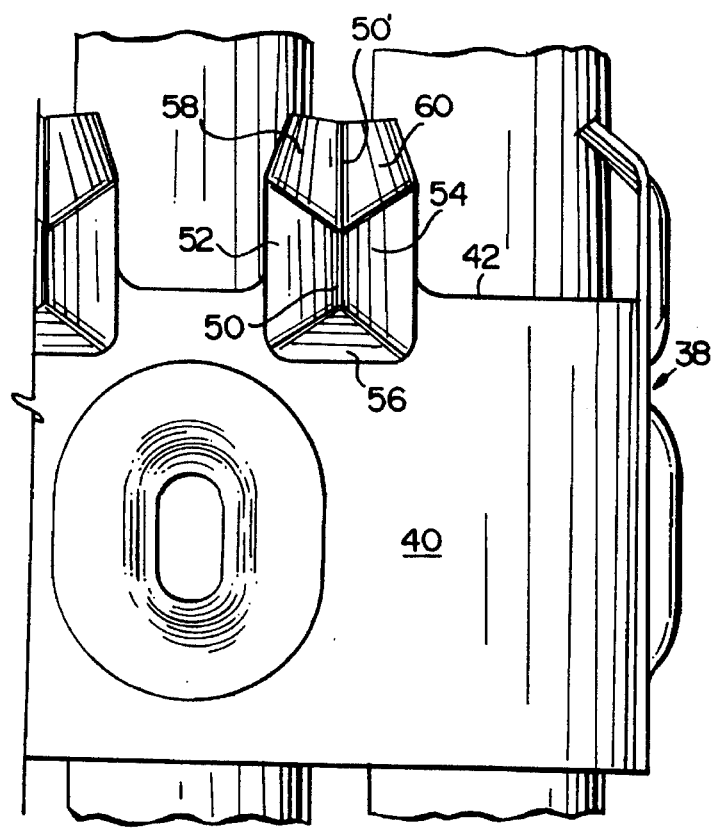
FIG. 9 is a front elevation of FIG. 8.

The modified and improved spacer 38 in accordance with this invention includes a peripheral band 40 having an uppermost edge 42. At intervals spaced about the periphery, as best seen in FIGS. 7 and 8, modified flow tabs 44 are provided which extend upwardly from the edge 42. Each flow tab 44 has a substantially vertical lower portion 46 and an upper portion 48 which extends upwardly and inwardly toward the fuel bundle. The substantially vertical portion 46 (a part of which is formed within the peripheral band itself) includes a vertical center line or crease 50 which lies to the outside of the peripheral band 40, as best seen in FIG. 6. This substantially vertical portion 46 of the flow tab 44 includes a pair of substantially planar portions 52 and 54 which are bent outwardly from the side edges of the flow tab such that the center line or crease 50 lies outside the peripheral band. A third substantially planar portion 56 having a substantially triangular configuration, also extends from the plane of the band 40 at the lowermost edge of the tab, outwardly and upwardly to the center line or crease 50.

The upper bent portion 48 of the flow tab 44 includes an inclined center line or crease 50' which extends from the vertical center line 50 and extends upwardly and inwardly toward the fuel bundle. A pair of substantially planar portions 58 and 60 are bent inwardly from the side edges 62 and 64 so that the center line or crease 50' lies below and inwardly of the side edges 58 and 60. In other words, the upper and lower portions 46, 48 of the flow tab 44 are characterized by reverse bends about a pair of contiguous center lines 50 and 50'. The bent upper portion 48 of the flow tab projects into the region between the fuel rods 12' as best appreciated from FIG. 7 and FIG. 8. Because of the secondary bend along the upper center line or crease 50', velocity components are imparted to the flow which are parallel to the band 40 and away from the flow tab 44. Thus, coolant flow is diverted in opposite directions away from the crease 50' to thereby impact directly on fuel rods 12' on either side of the flow tab. Thus, more water droplets are directed to the surfaces of the outer fuel rods 12' than in the conventional arrangement. In addition, this shape provides less flow resistance to flow generally through the bundle.

At the same time, the outward bend in the lower tab portion 46 rigidities the flow tab 44 and facilitates the manufacturing process. With reference specifically to FIG. 5 and FIG. 7a, if the bend angle A is equal to angle B, the top portion 48 of the flow tab 44 can be bent without any stretching of the material.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A spacer for use with a substantially vertically oriented fuel bundle in a nuclear reactor, the spacer comprising:

a matrix of ferrules for surrounding individual fuel rods within a bundle;

a substantially horizontally oriented band surrounding said matrix and defining a peripheral wall of the spacer, said band having an upper edge;

a plurality of laterally spaced flow tabs extending upwardly from said upper edge, each flow tab having a substantially vertical portion and an inclined portion; and first means on said inclined portion for imparting velocity components to a flow of coolant along said fuel rods, which components are substantially parallel to said band.

2. The spacer of claim 1 and further including second means on said vertical portion for rigidifying said flow tab.

3. The spacer of claim 1 wherein said first means includes a first pair of trapezoidal surfaces angled with respect to one another and said second means includes a second pair of trapezoidal surfaces also angled with respect to each other.

4. The spacer of claim 3 wherein said first and second pair of trapezoidal surfaces have contiguous center lines.

5. The spacer of claim 4 wherein each of said first and second pair of trapezoidal surfaces is substantially planar.

6. A spacer for use with a substantially vertically oriented fuel bundle in a nuclear reactor, the spacer comprising:

a matrix of ferrules for surrounding individual fuel rods within a bundle;

a substantially horizontally oriented band surrounding said matrix and defining a peripheral wall of the spacer, said band having an upper edge;

a plurality of laterally spaced flow tabs extending upwardly from said upper edge, each flow tab having a substantially vertical portion joined to said band and an inclined portion joined to said vertical portion and extending upwardly and inwardly relative to said vertical portion, said inclined portion having a first center line located downwardly and inwardly relative to a pair of lateral free edges of said inclined portion.

7. The spacer of claim 6 wherein said vertical portion has a second center line located outwardly relative to a pair of lateral free edges of said vertical portion.

8. The spacer of claim 6 wherein said inclined portion includes a first pair of substantially planar surfaces angled relative to each other about said first center line.

9. The spacer of claim 7 wherein said vertical portion includes a second pair of substantially planar surfaces angled relative to each other about said second center line.

10. The spacer of claim 9 wherein said first and second center lines are contiguous.

11. The spacer of claim 8 wherein said vertical portion includes a third substantially planar surface below said pair of substantially planar surfaces.

12. The spacer of claim 9 wherein a first included angle between said first pair of substantially planar surfaces is equal to a second included angle between said second pair of substantially planar surfaces.

13. A spacer for use with a substantially vertically oriented fuel bundle in a nuclear reactor comprising:

a matrix of ferrules for surrounding individual fuel rods within a bundle;

a substantially horizontally oriented band surrounding said matrix and defining a peripheral wall of the spacer, said band having an upper edge; and a plurality of laterally spaced flow tabs extending upwardly from said upper edge, each flow tab having a lower substantially vertical portion and an upper inclined portion extending away from said vertical portion, said vertical portion having a vertical crease and said inclined portion having an inclined crease, each located centrally of said tab.

14. The spacer of claim 13 wherein said vertical crease is located outside said band, and said inclined crease is located inside said band.

15. The spacer of claim 13 wherein each flow tab has a pair of side edges, and wherein said vertical crease lies outside the side edges in said vertical portion and said inclined crease lies inside the side edges on said inclined portion.

16. The spacer of claim 13 wherein said vertical portion includes a first pair of substantially planar surfaces on either side of said vertical crease, and said inclined portion includes a second pair of substantially planar surfaces on either side of said inclined crease.

17. The spacer of claim 16 wherein said portion includes a third substantially planar surface below said vertical crease and connecting said first pair of substantially planar surfaces.

\* \* \* \* \*